April 14, 1931. M. BRUN 1,801,137
AUTOMOBILE BODY
Filed March 2, 1931  2 Sheets-Sheet 1

Inventor
Marcel Brun
By Connolly Bros
Attorneys

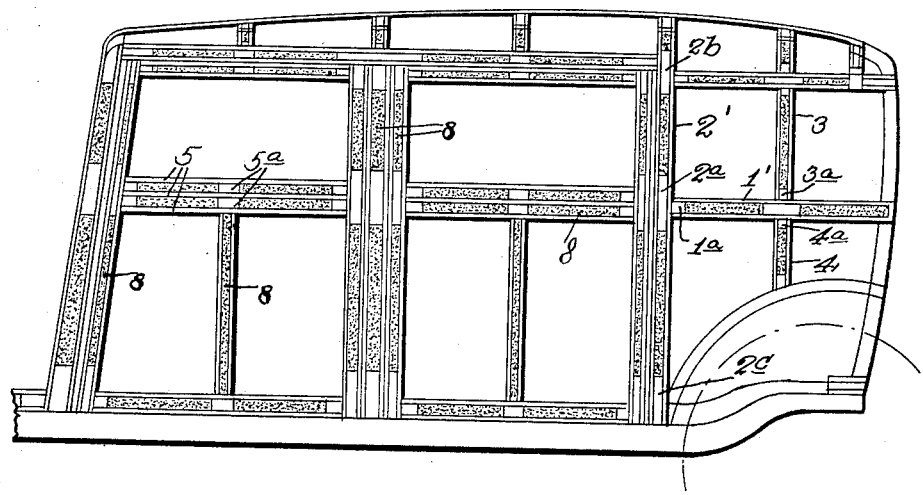
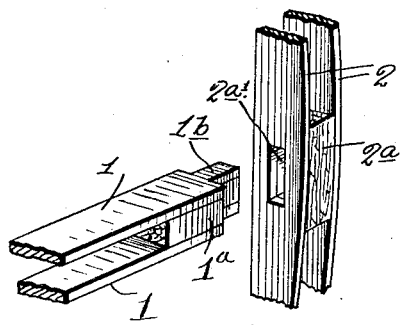
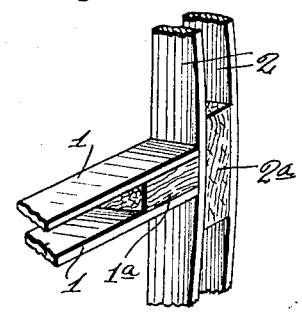
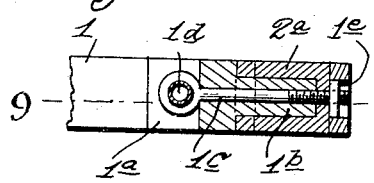
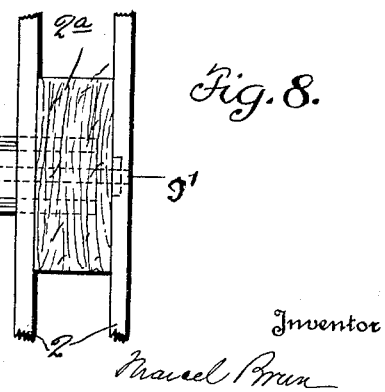
Inventor
Marcel Brun
By Connolly Bros
Attorneys Patented Apr. 14, 1931

1,801,137

UNITED STATES PATENT OFFICE

MARCEL BRUN, OF PARIS, FRANCE

AUTOMOBILE BODY

Application filed March 2, 1931, Serial No. 519,661, and in France February 27, 1930.

It is a well known fact that the actual wooden vehicle bodies have numerous disadvantages and are very costly because use is made of large timber for building standards or pillars, vertical stiles or other elements of the frame. These pieces of wood, which must be allowed to dry in the open air during a long period of time in suitable sheds in view of preventing warping after mounting, are preferably of ash-tree for these main elements which must secure the rigidity of the whole. This wood is costly in itself; and, after cutting of a vehicle body element out of an ash-tree plank, for instance, in the necessary direction of the grain, there remains a considerable waste portion which amounts as high as 40% of the original plank used for constructing that element.

On the other hand, the connections to the other frame elements constitute weak parts of the structure and require the use of thicker pieces for obtaining the desired strengthening. The whole of a carriage body so constituted is not unfrequently of a prohibitive weight for some automobile chassis the builders of which impose a maximum weight to the vehicle body designers.

It has been proposed to build vehicle bodies wholly of light metals, but such structures present numerous well known disadvantages: an untimely loosening of the numerous parts constituting that assembly; a metallic noise when shutting the doors; necessity of employing a specialized workmanship for mounting the various parts in view of obtaining an accurate assembling; the use of powerful machine-tools; a considerable waste of time for cutting, filing or boring thick metallic frame components, etc.

The new method of construction does away with all these disadvantages and consists, in principle, in building the said elements, by making use of veneered wood panels which are commercially sold in various thicknesses. Said panels of foreign woods are light owing to their nature and rigid owing to their structure in several layers. The directions of the grain being alternate in the thickness of the panels, the cutting of parts may be made so as to utilize the total area of said panel, disregarding the direction of the grain relatively to the efforts that the parts will subsequently undergo.

Figure 1:
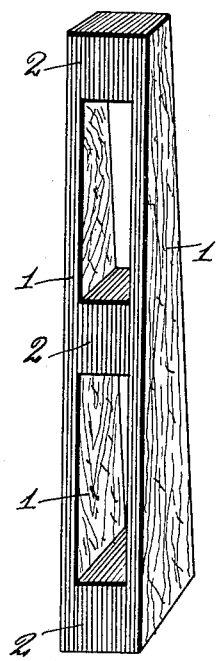
Figure 3:
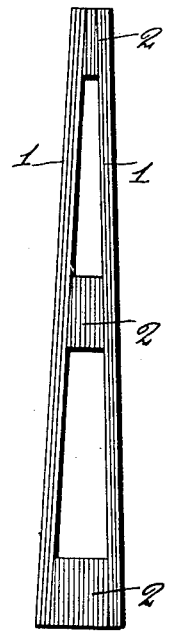
Figure 4:
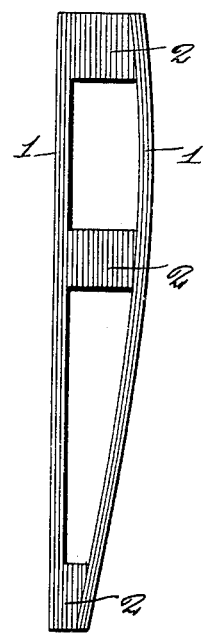
Figure 2:
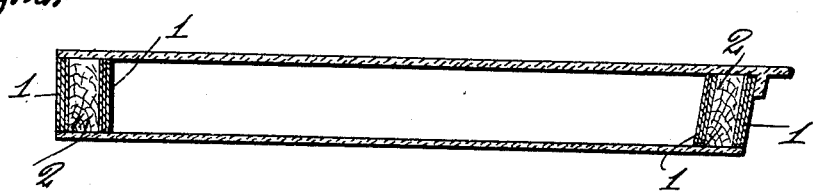
Figure 10:
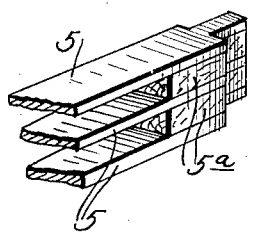
Figure 11:
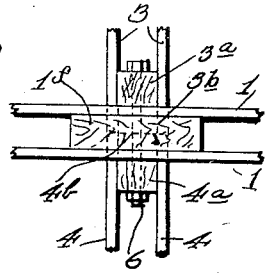
Figure 12:
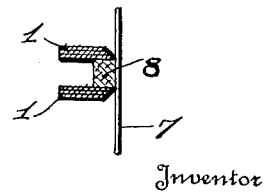

In the accompanying drawing:

Fig. 1 is a perspective vertical section of a stile or pillar constructed according to the invention; Fig. 2 is a horizontal section through a door likewise constructed according to the invention; Figures 3 and 4 are instances of outer forms which can be given to finished elements by merely inserting distance pieces having adequate forms. Figure 5 is a diagrammatic side elevation, on a smaller scale, of a vehicle body frame of somewhat conventional form, constructed in accordance with the invention; Figure 6 is a perspective view, before assembling, of two elements prepared for tenon jointing; Fig. 7 shows said elements, after jointing together; Fig. 8 is a view partly in section on line 9—9 of Fig. 9; Fig. 9 is a section along line 9'—9' of Fig. 8; Fig. 10 is a perspective view of a multiple element, prepared for tenon jointing with another element (not shown) provided with a mortise; Fig. 11 is an elevation showing a joint or connection of three elements; Fig. 12 is a vertical section, on a larger scale, showing a device for the sheet metal covering to bear against an element placed edgewise relatively to said covering, such as the belt.

According to the invention, and referring first to Figures 1 to 4, the walls 1 of the element to be constructed are cut out of panels of veneered wood and are held together by means of distance pieces 2 of veneer or of inexpensive soft wood for instance, so as to obtain the usual thickness of the pillar or stile or other element for vehicle bodies. Such distance pieces can be merely cold glued, nailed, etc. One gets thus an element possessing a very high rigidity, due to the girder shape of the structure, in addition to the own rigidity of the veneered panel. Owing to that construction there is realized a considerable reduction of weight, which is on the order of 50% over a corresponding solid element of ash-tree or even of light metal.

It is a known fact that veneered wood can be machined very easily without having recourse to a specialized workmanship. It has been said above that the panels have no grain direction; they can be cut, sawn, punched without risk of distortion; their lightness facilitates their handling. As their is no fear of warping, they need not be exposed to the open air as must be done with the usual timber which must be used only when well dried. Their storing can thus be made in any shed, where they are laid flat, in quantity just sufficient for supplying the immediate wants. The stocks are thus advantageously eliminated.

The securing of the various parts of a vehicle body may be made in any way, for instance by direct gluing or screwing of said parts, or through the medium of gussets of wood or metal. In the same way, squares, stretchers or any other usual strengthening member may be suitably combined with the new elements.

The outer covering of the vehicle body may likewise be made in a known manner, by means of veneer panels, leather, sheet metal, agglomerated cork, light cements and the like.

Referring now to Figs. 5 to 9, 1' denotes the belt of the vehicle body, and 2' one of the two pillars adjacent to said belt; 3—4 indicate an upright in two parts. As more particularly shown in Figs. 6 and 7, each element is constituted by a number of veneers—two in the example shown—separated by a plurality of distance pieces suitably placed between them and particularly at their ends as shown in Figures 1-4. As to the belt 1', it is provided with two veneers 1, 1 separated, particularly at its end shown in Figures 6 and 7, by a distance piece $1^a$, glued to the veneers 1, 1. The pillar or upright 2' is, likewise, made of two veneers 2, 2 separated and connected together by a number of distance pieces $2^a$, $2^b$, $2^c$.

According to the invention, the connection between the pillar 2' and the belt 1' is constituted by a tenon $1^b$, cut, as shown in Figure 6, in the three layers—veneers 1, 1 and distance piece $1^a$—and a mortise $2^{a1}$, provided in one of the veneers 2 and the corresponding distance piece $2^a$.

The assembling is effected by inserting tenon $1^b$ into mortise $2^a$, and merely gluing the parts, as shown in Figure 7, or connecting them by means of a bolt or a tie. For instance the device shown in Figures 8 and 9 may be used. In this form of construction, the distance piece $1^a$ and the elementary tenon $1^b$ situated at its end, are provided with a recess for a screw threaded tie $1^c$, which is connected to distance piece $1^a$ and to both veneers 1, by means of a tubular or other rivet, $1^d$, which passes through the three layers of the belt end and through the eye of tie $1^c$. At the other end of said tie, a nut $1^e$, sunk into the pillar 2', secures said tie to said belt, as shown in Figures 8 and 9.

Referring now to Figure 10, it is seen how it is possible, by applying the principle hereinbefore described, to form a strong connecting tenon in a belt or stile or other element constituted by a plurality of veneers 5, separated two by two by distance pieces $5^a$ glued upon the veneers, by giving said tenon $5^b$, the total height of the veneers and distance pieces.

Referring now to Figure 11, it is seen that the connection between the belt 1' and the two-parts upright 3—4 is realized by inserting into said belt two tenons $3^b$ $4^b$, cut like tenon $1^b$ of Figure 6, and the height of which is equal to that of the three layers of veneers 3, 3 and 4, 4 respectively, and of the corresponding distance pieces $3^a$ and $4^a$. The mortise provided in the belt passes wholly through the three layers of veneers 1, 1 and distance piece $1^f$. The final connection of the three elements 1, 3 and 4 may be effected by gluing and by means of a tie or bolt such as 6, so disposed as to joint the two ends 3, 4 of the upright. The space existing between the veneers enables the bolt head to be maintained during the screwing of the nut of the other end.

Figure 12 shows how, according to the invention, there can be obtained an elastic and sound deadening bearing of the sheet metal covering against the edge of the hollow frame components; Figure 5 shows that all frame parts are so placed that the veneers are substantially at right angles to the covering, and not parallel with it. According to the invention, the covering 7 bears against the various hollow elements which are placed edgewise through the interposition of a slightly elastic material such as agglomerated wood fibre and particularly the material registered under the trade name "insulite," placed at 8, as shown in Figures 5 to 12, between veneers 1, 1, in the spaces between the distance pieces $1^a$, $1^f$, etc. and in such a manner as to slightly project from the edge of said veneers. The covering is attached by screwing upon the distance pieces. As shown in Figure 5, the interposition of "insulite" as a bearing for the sheet metal covering takes upon all elements whether fixed or movable (doors) of the vehicle body frame. That material has indeed two effects: (1) It provides for the vehicle body a soft and sound deadening bearing, which tends to eliminate the metallic noise which takes place in the usual vehicle bodies particularly when shutting the doors; (2) it improves the strength of the hollow frame elements made of veneer. As a matter of fact, it provides an elastic bracing of the veneers of the various hollow elements, veneers which, in the parts comprised between two successive distance pieces, tend to come nearer each other under the effect of bending or twisting forces; the "insulite" disposed between the veneers, as indicated in Figure 12 of the drawing, constitutes a partial filling which is both light and elastic.

What I claim is:

1. In a vehicle body frame construction, interrelated upright and longitudinal frame members, composed, each, of a plurality of sections of laminated veneer, spaced apart and provided with interposed distance blocks located at spaced intervals lengthwise of the sections and providing means for the interlocking together of the frame members at intersecting points.

2. An automobile body construction as claimed in claim 1, the spaces between the distance blocks of the sections being filled with elastic material projecting beyond the outer edges of the laminated members and adapted to constitute a bearing for the sheathing of the vehicle.

In witness whereof I affix my signature.

MARCEL BRUN.